United States Patent Office 3,305,402
Patented Feb. 21, 1967

3,305,402
PLATINUM AND RUTHENIUM OXIDE
CONTAINING CATALYSTS
Frank Jones and Maurice Robert Andrew, Chester,
England, assignors to Johnson, Matthey & Company
Limited, London, England, a British company
No Drawing. Filed Sept. 28, 1964, Ser. No. 399,876
Claims priority, application Great Britain, Sept. 30, 1963,
38,398/63
5 Claims. (Cl. 136—120)

This invention relates to improvements in and relating to catalysts for use in carrying out catalytic reactions, such, for example, as oxidation, reduction, hydrogenation and hydrogenolysis, and including electrochemical processes, such as anodic oxidation which occurs in fuel cell operation.

The invention contemplates the provision of a catalyst or a catalyst material for use in carrying out catalytic reactions, which comprises an intimate homogeneous mixture of the oxides of platinum and of ruthenium, said mixture being other than a mere physical admixture of the said oxides and the said oxides being present in the mixture in the relative proportions to give 99–90% by weight of platinum and 1–10% by weight of ruthenium.

The invention also has for its object the provision of a catalyst comprising an intimate homogeneous mixture of platinum and ruthenium which has been obtained by reduction of a catalyst material according to the main feature of the invention.

In carrying out the invention in practice, it is preferred to use from 2% to 7% by weight of ruthenium, satisfactory results being obtainable with the use of between 3% and 6% by weight thereof.

Whilst any suitable method may be employed in the preparation of the catalyst, it has been found that the most satisfactory results are obtained by he use of the so-called Adams method by fusing suitable platinum and ruthenium compounds in appropriate relative amounts with sodium nitrate.

The invention, therefore, also comprises a method of making a catalyst or catalyst material for use in carrying out catalytic reactions which comprises forming a mixture of suitable compounds of platinum and ruthenium in appropriate relative proportions, and fusing said mixture with sodium nitrate to form an intimate homogeneous mixture of the oxides of the said metals in the proportions to give 99–90% by weight of platinum and 1–10% by weight of ruthenium.

The following is an example of the manner in which the invention may be carried out in practice.

Ammonium chloroplatinate and ruthenium trichloride, in relative amounts such that the amount of metal totalled 7.5 grams, were intimately ground together in the required relative proportions in a mortar. The mixed salts were then added gradually in small amounts and with constant stirring to 200 grams of molten sodium nitrate at a temperature of 380–400° C. When all the mixture had been added, the temperature of the melt was raised to 460–480° C. and held at this temperature for 10 minutes. The melt was then allowed to solidify and was leached with water whilst still hot. The resultant oxide mixture was separated, washed thoroughly by decantation and finally by filtration until free from chlorides. The mixture was then dried under vacuum over calcium chloride. The oxides in the mixture were finally reduced to the metal to form an active catalyst.

When the improved catalyst material or catalyst is used in a fuel cell, the catalyst is preferably mounted on an electrode comprising either an electrically conductive metal sheet or plate, for example, of copper, made inert to the action of electrolyte by means of a layer of noble metal thereon, or a non-conducting sheet made conductive by means of a noble metal layer.

In connection with this application of the invention, the following Table I shows, by way of example, the results of experiments in which electrodes having thereon catalysts prepared in accordance with the invention were suspended in N sulphuric acid containing methanol and caused to function as half-cells. For comparison purposes the results attained with an electrode carrying a catalyst of platinum metal only are also shown.

TABLE I

| Reference voltage | Catalyst, Current density, milliamp./cm.$^2$ | |
|---|---|---|
| | Pt | 95% Pt, 5% Ru |
| 0.40 | 1 | 7 |
| 0.45 | 2 | 21 |
| 0.50 | 9 | >30 |

From this table, it is clear that, for a given reference voltage, an electrode carrying the improved catalyst of the invention gives a substantially higher current density than does an electrode carrying a catalyst consisting of platinum metal only.

In addition to the use thereof in a fuel cell or in other electrochemical processes, the improved catalyst material or catalyst may advantageously be used for other catalytic processes, such as the hydrogenation or the reduction of nitrobenzene, the hydrogenation of cyclohexene, cyclohexanone or acetophenone.

The improved catalytic properties of various catalysts in accordance with this invention, compared with those of a catalyst of pure platinum, are clearly shown in the following Tables II and III. Table II shows the activity in the hydrogenation of nitrobenzene, and Table III shows the activity in the hydrogenation of a number of other compounds.

TABLE II

| Percent Ru in catalyst | | Nitrobenzene Activity |
|---|---|---|
| Wt. | Atomic | |
| 0 | 0 | 38 |
| 2.5 | 5.0 | 54 |
| 5.0 | 9.25 | 54 |
| 5.5 | 10.25 | 85 |
| 7.3 | 13.20 | 89 |
| 10.0 | 17.60 | 81 |

As will readily be seen from Table II, the activity of catalyst in accordance with the invention was greatly superior to that of a catalyst consisting of platinum only, the activity increasing with increase in the percentage of ruthenium in the mixture up to a maximum at about 7.5% Ru.

TABLE III

| Pt/Ru Catalyst, Atomic Percent Ru | Activity | | | | | | |
|---|---|---|---|---|---|---|---|
| | 2-methyl-3-butyne-2-ol | Phenyl acetylene | Maleic Acid | Cyclohexene | Cyclohexanone | o-Nitroaniline | Pyridine |
| 0 | 53 | 26 | 62 | 30 | 21.5 | 43 | 13.4 |
| 5.0 | 122 | 41 | | 32 | | 47 | 20.3 |
| 9.5 | 102 | | | | | | |
| 10.5 | | | | | 31.0 | | |
| 13.2 | 84 | 27 | 115 | 36 | | 75 | 16.5 |

As will be appreciated from a consideration of the above Table III, catalysts embodying the invention were more active in all the hydrogenations referred to than catalysts of pure platinum. In the case of 2-methyl-3-butyne-2-ol, and phenyl acetylene, the highest activity occurred with a 5 atomic percent Ru-containing catalyst. A similar efficiency was shown in the case of the hydrogenation of pyridine.

In the case of maleic acid hydrogenation, the activity of a 13.2 atomic percent Ru-containing catalyst was nearly twice as great as that of a platinum catalyst. Increased activity was also shown with this catalyst in the hydrogenation of o-nitro-aniline.

It is to be understood that whilst some examples of catalysts embodying the invention, and a suitable manner in which they may be prepared, have been described above, no limitation is intended thereby, but modifications may be made thereto without departing from the scope of the invention. For example, any other suitable method of manufacture may be employed to make the improved catalyst material and the relative proportions of ruthenium and platinum may be varied as desired within the stated limits.

The invention is intended to include within its scope a fuel cell electrode incorporating a catalyst or catalyst material in accordance with the invention, or a fuel cell incorporating such an electrode and also any catalytic process when carried out with the use of the improved catalyst or catalyst material, and the product of any such process.

It is, furthermore, to be understood that the catalyst material or catalyst in accordance with the invention may be used in either the supported or unsupported form.

What we claim is:

1. A catalyst material for use in carrying out catalytic reactions, said catalyst material consisting essentially of an intermolecular mixture of the coprecipitated oxides of platinum and ruthenium, the said oxides being present in the relative proportions to give 99–90% by weight of platinum and 1–10% by weight of ruthenium.

2. A catalyst material for use in carrying out catalytic reactions, said catalyst material consisting essentially of an intermolecular mixture of the coprecipitated oxides of platinum and ruthenium, the said oxides being present in the relative proportions to give 98–93% by weight of platinum and 2–7% by weight of ruthenium.

3. A catalyst material for use in carrying out catalytic reactions, said catalyst material consisting essentially of an intermolecular mixture of the coprecipitated oxides of platinum and ruthenium, the said oxides being present in the relative proportions to give 97–94% by weight of platinum and 3–6% by weight of ruthenium.

4. A catalyst for use in carrying out catalytic reactions, said catalyst consisting essentially of a support and carried by said support an intermolecular mixture of the coprecipitated oxides of platinum and ruthenium, the said oxides being present in the relative proportions to give 99–90% by weight of platinum and 1–10% by weight of ruthenium.

5. A fuel cell electrode consisting essentially of an electrode body and deposited on said body a catalyst material, said catalyst material consisting essentially of an intermolecular mixture of the coprecipitated oxides of platinum and ruthenium, the said oxides being present in the relative proportions to give 99–90% by weight of platinum and 1–10% by weight of ruthenium.

References Cited by the Examiner

UNITED STATES PATENTS

| | | | |
|---|---|---|---|
| 1,940,934 | 12/1933 | Bennett et al. | 252—472 |
| 2,267,753 | 12/1941 | Ruthardt | 252—472 |
| 2,487,054 | 11/1949 | Howk | 252—472 |
| 3,055,840 | 9/1962 | Koch | 252—472 |
| 3,117,034 | 1/1964 | Tirrell | 136—86 |

ALLEN B. CURTIS, *Primary Examiner.*

WINSTON A. DOUGLAS, *Examiner.*

A. SKAPARS, *Assistant Examiner.*